INVENTOR.
MICHAEL CZUHA, JR.
BY
Christie, Parker & Hale
ATTORNEYS

United States Patent Office 3,001,918
Patented Sept. 26, 1961

3,001,918
METHOD AND APPARATUS FOR WATER CONTENT DETERMINATION
Michael Czuha, Jr., Temple City, Calif., assignor, by mesne assignments, to Consolidated Electrodynamics Corporation, Pasadena, Calif., a corporation of California
Filed July 13, 1959, Ser. No. 826,557
10 Claims. (Cl. 204—1)

This invention relates to the determination of the water content of a substance by absorbing moisture from the substance in a hygroscopic material and electrolyzing the absorbed water. More particularly, the invention relates to improvements in such determinations, by which the moisture passes through a diffusion barrier so that the mass transport rate of moisture across the diffusion barrier, and therefore the moisture absorbed, is proportional to the water content of the substance.

Methods and devices for the determination of the water content are well known. United States Patent No. 2,830,945 to F. A. Keidel, issued April 15, 1958, discloses various devices for such determination. In such devices, the substance whose water content is to be determined is passed adjacent a hygroscopic material. The moisture is absorbed by the hygroscopic material, that is, the substance is dried as it passes through the device. The conventional device contains two electrodes which are in contact with the hygroscopic material but separate from each other. By applying an electrical potential between these two electrodes, the moisture absorbed as water by the hygroscopic material is electrolyzed, that is, broken down to elemental hydrogen and oxygen.

According to Faraday's laws of electrolysis, the electrical current which flows between the two electrodes during electrolysis is directly proportional to the amount of water decomposed. The amount of water decomposed by electrolysis can therefore be determined. By computing the volume of material passing through the device and the amount of water decomposed, the percentage of water in the substance is found.

A limitation of such devices is that, in order to be accurate, the entire moisture content of the substance must be absorbed by the hygroscopic material. Conventional devices of convenient size become saturated with moisture at comparatively low moisture levels. Such devices are therefore unable to give a true indication of the water content of the substance when high moisture contents are to be determined.

According to the present invention, a diffusion barrier is established between the substance whose water content is to be determined and the hygroscopic material. This diffusion barrier is permeable to moisture. The moisture diffuses through the barrier and is absorbed by the hygroscopic material. In the present invention, the hygroscopic material absorbs moisture as rapidly as it passes through the diffusion barrier. The limiting factor in the rate of absorption of moisture is, then, the mass transfer rate of the moisture through the barrier, rather than the absorption capacity of the hygroscopic material. Thus, the size of the device is much smaller than conventional devices of like capacity, since only a portion of the total moisture of the substance is absorbed.

A gradient of moisture concentration, which functions as the diffusion driving force, exists across the barrier, since there is essentially no moisture content on the hygroscopic material side of the barrier. It has been found that the driving force, and therefore the mass transfer rate, of moisture, which results because of this gradient, is directly proportional to the water content. Therefore, by electrolyzing the absorbed water, which according to the invention is a known fraction of the actual water content of the substance, the water content of the substance can be determined.

The invention may be more readily understood by referring to the accompanying drawing in which.

Figure 1:
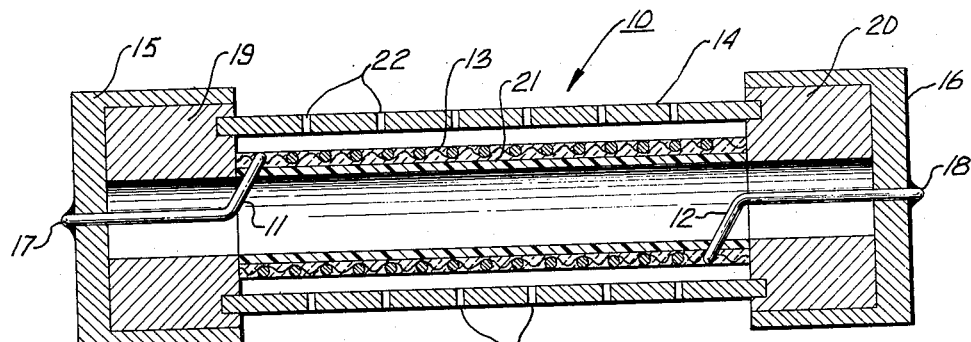
FIGURE 1 is a sectional view of an apparatus according to the invention for determining the water content of a substance.

Referring to FIG. 1, a cell 10 for measuring water content has a first electrode 11 and a second electrode 12 which are in contact with a hygroscopic material 13. The hygroscopic material may be, for example, phosphorus pentoxide, although other satisfactory materials are well known in the art. A diffusion barrier 14 and two end caps 15 and 16 serve to form a housing about the hygroscopic material 13. The two end caps 15 and 16 have electrode terminals 17 and 18, respectively. The electrode terminals 17 and 18 are connected to the electrodes 11 and 12, thereby providing electrical connections to these electrodes through the caps 15 and 16. Support rings 19 and 20 are mounted on caps 15 and 16, respectively, to support the diffusion barrier 14. A glass mandrel 21 is used to support the two electrodes 11 and 12 and the hygroscopic material 13. The diffusion barrier 14 has pores 22 extending therethrough. Alternatively, a thin permeable membrane can be used.

The two electrodes 11 and 12 are shown as being helically wound about a common axis and having equal diameters. The two electrodes 11 and 12 are axially positioned so as to form parallel helical traces. Alternate electrode configurations may be used, the important requirement being that the hygroscopic material is in contact with the electrodes.

The rate of mass transfer of moisture through the diffusion barrier 14 has been found to be directly proportional to the number of pores therein and the diameter of the individual pore. The diffusion barrier 14 is selected from those substances which are substantially nonabsorbent with respect to moisture. Such nonabsorbency is necessary in order to insure that all of the moisture entering the diffusion member pores diffuses therethrough. Otherwise, moisture would be retained in the diffusion member, and, upon electrolysis of the absorbed moisture in the hygroscopic material, an incorrectly low water content would be indicated. As an example, the diffusion member may be made of polytetrafluoroethylene having pores extending therethrough either formed when the member is shaped or subsequently bored, as may be appropriate for the particular application. Other materials which may be utilized to construct the diffusion member include polyethylene and metallic members coated with silicone films.

The cell 10 is placed in the substance whose water content is to be determined. The substance need not be a gas. For example, the cell 10 can be placed in explosives or dirt or any other material which may have a water content. However, the cell 10 should not ordinarily be used to measure the water content of a liquid unless a thin permeable membrane is utilized, since diffusion of the liquid through the porous barrier would upset the moisture-diffusion process. After the cell 10 has been placed in the substance whose water content is to be determined, an electrical potential difference is applied between the two electrode terminals 17 and 18. This electrical potential difference initiates electrolysis of the moisture which has been absorbed as water by the hygroscopic material 13. The current between the electrodes 11 and 12 indicates the rate at which the absorbed water is being electrolyzed.

Once the diffusion gradient through the diffusion barrier 14 has been established, the electrical current remains constant for a given water content and changes only in relation to changes in the water content of the substance being measured. Therefore, once the cell 10 is calibrated for a known water content in the substance, the cell 10 may be used to measure any other water content of such a substance.

In has been found that the situs of the decomposition of the moisture by electrolysis is primarily at the electrode which is connected as the anode. This discovery permits alternate embodiments of the invention in which only one electrode, the anode, is positioned between the source of moisture and the hygroscopic material. Electrical circuit continuity between the anode and the second electrode, the cathode, within the cell, is provided by the hygroscopic material which contacts both electrodes.

Figure 2:
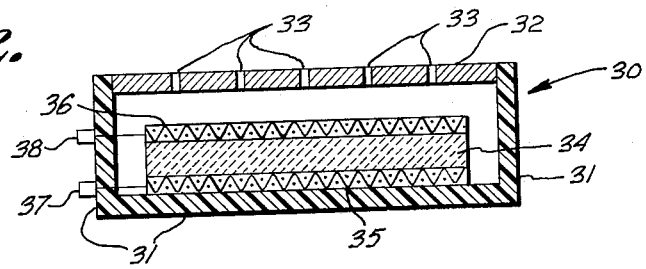
FIGURE 2 is a sectional view of an alternate embodiment of an apparatus for determining the water content of a substance.

A device constructed according to this alternate embodiment is shown in FIG. 2. In FIG. 2, a cell 30 has three nonpermeable sides 31 and a permeable side 32, the permeability of which is illustrated by pores 33. A hygroscopic material 34 is contained within the container 30. A first electrode 35, to be connected as the cathode, and a second electrode 36, to be connected as the anode, are positioned on either side of the hygroscopic material. The second electrode 36 is permeable to moisture so that the moisture passing through the permeable side 32 of the container 30 also passes through the second electrode 36 and is absorbed by the hygroscopic material 34. The first and second electrodes 35 and 36 may be constructed, for example, of wire gauze. A first electrode terminal 37 and a second electrode terminal 38 are connected to the first and second electrodes 35 and 36 respectively. The device of FIG. 2 can be constructed so that moisture contacts the anode directly rather than passing through a diffusion barrier. However, such a device has the limited capacity of the known prior art devices.

The device of FIG. 2 functions in a manner similar to that described with respect to FIG. 1. Moisture passes through the permeable side 32, the second electrode 36, and is absorbed by the hygroscopic material 34. An electrical potential difference is established between the first and second electrodes 35 and 36 by means of an electrical potential difference source (not shown) applied between the first and second electrode terminals 37 and 38. This electrical potential difference initiates electrolysis of the absorbed moisture in the hygroscopic material, the current of electrolysis being proportional to the amount of water electrolyzed.

Figure 3:
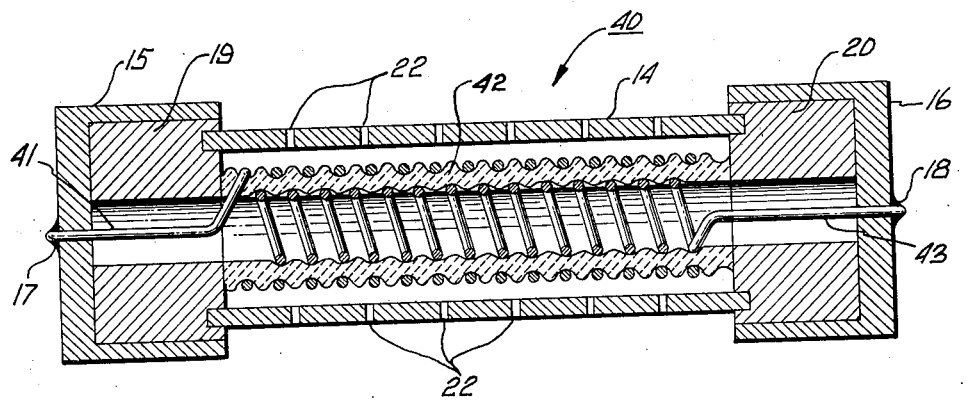
FIGURE 3 is a sectional view of another alternate embodiment of an apparatus for the determination of the water content of a substance.

FIGURE 3 is a sectional view of another alternate embodiment of a moisture content determination device. The device of FIG. 3 is similar to the device of FIG 1. However, in the device of FIG. 3, the two electrodes are helically wound with different diameters and are concentrically positioned with respect to each other so as to be separated by and in contact with the hygroscopic substance. The water content determination cell 40 has as its anode a first electrode 41, which forms a helix about and in contact with the outer surface of a hygroscopic material 42. The cathode consists of a second electrode 43 which forms a helix in contact with the inner surface of the hygroscopic material 42. The hygroscopic material 42 separating the two electrodes 41 and 43 is preferably constructed by impregnating glass fiber or cloth with a suitable hygroscopic substance. The glass fiber or cloth adds additional strength to insure proper electrode separation and to maintain the hygroscopic material 42 in contact with the electrodes. The electrodes are shown as wire helices but may alternatively be made of mesh or have other configurations.

The device of FIG. 3 functions in a manner similar to that described with respect to FIG. 1. Electrical circuit continuity is provided by the hygroscopic substance 42 when water is absorbed thereby. Therefore, the current of electrolysis is proportional to the water content of the substance.

If desired, rather than diffusing the water through the outer surface of the housing of the devices of FIGS. 1 and 3, the devices could be so constructed so as to allow the substance whose water content is to be measured to pass through the hollow central portion of the devices. An appropriate diffusion barrier is then positioned therein and moisture diffused therethrough so as to contact the hygroscopic substance. In the device of FIG. 1 such a modification would also necessitate the elimination of the glass mandrel so as to permit the moisture to reach the hygroscopic substance and incorporation of an outer support and seal to prevent influx of atmospheric moisture. In FIG. 3, the designations of the anode and cathode are preferably reversed in such a modification.

The cell of this invention has one particular advantage over conventional cells of this type. This advantage lies in that only a small fraction of the water content of a substance need be absorbed in order to give a true indication of the actual water content of the substance. Thus, the device may be much smaller physically than comparable conventional devices. This advantage is achieved by establishing the diffusion gradient of the moisture through the diffusion barrier. The driving force on the moisture toward the hygroscopic material causes the mass transfer rate of the moisture to vary in a given cell only with the differential in water content on the two sides of the diffusion member. Thus, the present invention may be applied to any process in which the water content of a substance is determined by absorbing moisture in a hygroscopic material and electrolyzing this absorbed moisture to given an indication of water content.

I claim:

1. An improvement in the method of determining water content of substances by the absorption of moisture therefrom by a hygroscopic substance, the quantitative electrolyzation of the absorbed moisture, and the measurement of the current required for said quantitative electrolysis, comprising diffusing the moisture through a porous member which is substantially nonabsorbent with respect to water in order to limit the rate of mass transfer of moisture between the substance whose water content is to be determined and the hygroscopic substance.

2. A method of determining the water content of a substance consisting of the steps of diffusing, in the form of moisture, a portion of the water through a porous member which is substantially nonabsorbent with respect to moisture, bringing the diffused moisture in contact with a hygroscopic substance so that the diffused moisture is absorbed by the hygroscopic substance, said hygroscopic substance being substantially electrically nonconductive unless water has been absorbed thereby, subjecting the water absorbed by the hygroscopic substance to complete quantitative electrolysis, and measuring the electrical current of said quantitative electrolysis.

3. A device for use in determining the water content of a substance comprising a first and a second electrode, a hygroscopic substance connecting substantial portions of the first and second electrodes, said hygroscopic substance being substantially electrically non-conductive unless water has been absorbed thereby, and a housing enclosing the connecting hygroscopic material, said housing including an electrode terminal connected to each electrode and a diffusion member which is permeable and substantially nonabsorbent with respect to moisture and is positioned between one of the electrodes and the substance whose water content is to be determined.

4. A device as defined in claim 3 and in which the electrodes are helically wound and axially positioned so as to form parallel traces of helices of equal diameters.

5. A device as defined in claim 3 in which the electrodes are positioned on opposite sides of and in contact with the hygroscopic substance.

6. A device as defined in claim 3 in which the electrodes are helically wound with different diameters and are concentrically positioned with respect to each other so as to be separated by and in contact with the hygroscopic substance.

7. A device for use in determining the water content of a substance comprising adjacent electrodes, a hygroscopic substance connecting the electrodes, said hygroscopic substance being substantially electrically non-conductive unless water has been absorbed thereby, and a housing enclosing the hygroscopic material connecting the electrodes, a substantial portion of said housing being permeable and substantially nonabsorbent with respect to moisture.

8. A device for use in determining the water content of a substance comprising a pair of adjacent electrodes helically wound about an axis, a hygroscopic substance connecting the helical portions of the electrodes, said hygroscopic substance being substantially electrically non-conductive unless water has been absorbed thereby, and a housing enclosing the hygroscopic material connecting the electrodes and having a substantial portion thereof which is permeable and substantially nonabsorbent with respect to moisture.

9. A device for use in determining the water content of a substance comprising a pair of electrodes, at least one of which is permeable with respect to moisture, a hygroscopic substance separating and in contact with said electrodes, and a housing enclosing the hygroscopic material and the electrodes and having a moisture-permeable portion positioned adjacent the moisture-permeable electrode.

10. A device for use in determining the water content of a substance comprising a hygroscopic material, a pair of electrodes disposed on opposite sides of the hygroscopic material and in contact therewith, one of said electrodes being permeable with respect to moisture, and a housing enclosing the electrodes and hygroscopic material and adapted to allow moisture to pass therethrough adjacent the moisture-permeable electrode.

References Cited in the file of this patent

UNITED STATES PATENTS

| | | |
|---|---|---|
| 2,816,067 | Keidel | Dec. 10, 1957 |
| 2,830,945 | Keidel | Apr. 15, 1958 |
| 2,913,386 | Clark | Nov. 17, 1959 |